UNITED STATES PATENT OFFICE.

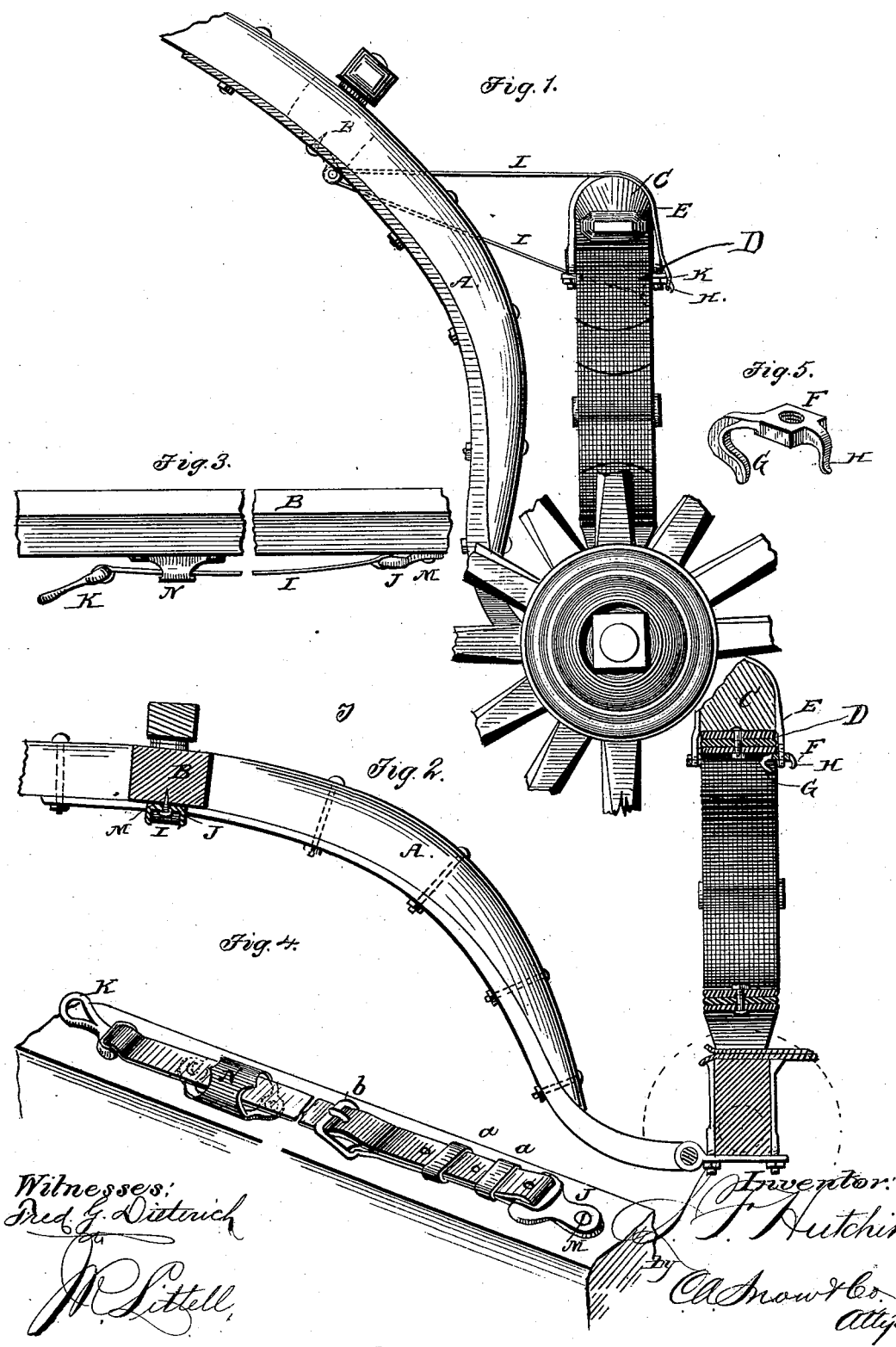

LEVI F. HUTCHINS, OF DAYTON, OHIO.

THILL-SUPPORT.

SPECIFICATION forming part of Letters Patent No. 233,858, dated November 2, 1880.

Application filed September 11, 1880. (No model.)

*To all whom it may concern:*

Be it known that I, LEVI F. HUTCHINS, of Dayton, in the county of Montgomery and State of Ohio, have invented certain new and useful Improvements in Thill-Supports; and I do hereby declare that the following is a full, clear, and exact description of the invention, which will enable others skilled in the art to which it appertains to make and use the same, reference being had to the accompanying drawings, which form a part of this specification.

Figure 1 is a side elevation of a vehicle, the front wheels and shafts only being shown, embodying the improvements in my invention. Fig. 2 is a vertical longitudinal sectional view of the same. Fig. 3 is a front elevation, showing the thill-support detached from the hook and sheathed beneath the cross-bar of the shafts. Fig. 4 is a detailed view of the strap, and Fig. 5 is a perspective view of the hooked nut.

This invention has relation to thill-supports; and it consists in the improved features of construction and combination hereinafter fully described, and particularly pointed out in the claims.

Referring by letter to the accompanying drawings, A designates the shafts of the vehicle, and B the cross-bar of the same. The shafts are secured to the vehicle in any of the well-known ways now practiced.

C designates the spring-bar, and D the upper portion of a leaf-spring. To the threaded end of the rear arm of one of the clips E, by which the spring-bar C is connected with the spring, is secured a hooked nut, F, or a nut provided with a front hook, G, and a rear hook, H, both curved downwardly. I have projected the front hook, G, from the left-hand corner of the nut as it stands when screwed to place, and the hook H projects centrally from the rear face; but this position is not material, and other positions may be adopted without departing from the invention.

L designates a strap, provided at one end with a perforated plate, J, and at the other with a loop, K. The strap L is perforated for the reception of the buckle-tongue, and is provided with loops $a\ a$ and a buckle, $b$, in order to permit it to be lengthened or shortened at pleasure, to adapt it, when in use, to vehicles of different sizes. Where, however, each vehicle is to be provided with a thill-support the buckles and loop are not needed, and a plain strap provided with a swiveled plate at one end and a swiveled loop at the other may be employed. The perforated plate J is secured at the middle of the cross-bar B of the shafts by a screw, M. A sheath, N, is also secured to the under face of the cross-bar B at an appropriate distance from the center or middle of the cross-bar B, to permit the end of the strap L, when not connected with either of the hooks G or H, to be sheathed therein, and thus prevented from dangling from the cross-bar while the vehicle is in use.

When the vehicle is not in use, or during the operation of hitching the animal to the vehicle, the shafts should be elevated and the loop K connected with the hook G, or the strap passed over the spring-bar C and hooked onto the hook H. If the vehicle is to remain idle, the strap will support the shafts in an elevated position. If the animal is to be hitched up, the strap will hold the shafts in an elevated position until the animal is under them, when, by raising the points of the shafts, the loop K will, by its own gravity, drop from the hook G or H, as the case may be, and permit the shafts to descend upon the animal, and the hitching may be then completed.

As before stated, when the strap is not needed to support the thills it should be sheathed in the sheath N.

This device is cheap, simple, and convenient, and its construction and operation will be readily understood from the foregoing description, taken in connection with the accompanying drawings.

I am aware that a self-detaching thill-support is not broadly new, as one secured at one end to the under face of the cross-bar of the thills and at the other end to the head of a bolt on the under face of the upper portion of the forward spring is shown in Patent No. 201,329.

I am also aware that a support-strap secured at one end to the spring-bar of the vehicle has been provided at the other end with an arrow-headed hook which engages a staple on the cross-bar of the thills, and when not in use may be swung up and caught upon a headed stud projecting from the rear face of the spring-bar, as may be seen in Patent No. 190,727, and I do not therefore lay claim to either of said constructions herein.

Having thus fully described my invention, what I claim as new, and desire to secure by Letters Patent of the United States, is—

1. In a thill-support, the strap L, pivoted upon the under face of the cross-bar B of the thills midway of said cross-bar, in combination with the sheath N, secured to the under face of said cross-bar B at a point that will maintain the strap in a position nearly parallel with said cross-bar when the support is not in use, as set forth.

2. In a thill-support, and in combination with the spring D, the nut F, provided with the downwardly-curved hooks G and H, constructed and operating substantially as and for the purposes set forth.

In testimony that I claim the foregoing as my own I have hereto affixed my signature in presence of two witnesses.

LEVI F. HUTCHINS.

Witnesses:
JOSEPH W. ALLISON,
ALONZO WAYMIRE.